No. 762,025. PATENTED JUNE 7, 1904.
E. CHESHIRE.
CONTROLLING VALVE FOR AIR BRAKE SYSTEMS.
APPLICATION FILED NOV. 11, 1903.
NO MODEL. 2 SHEETS—SHEET 1.
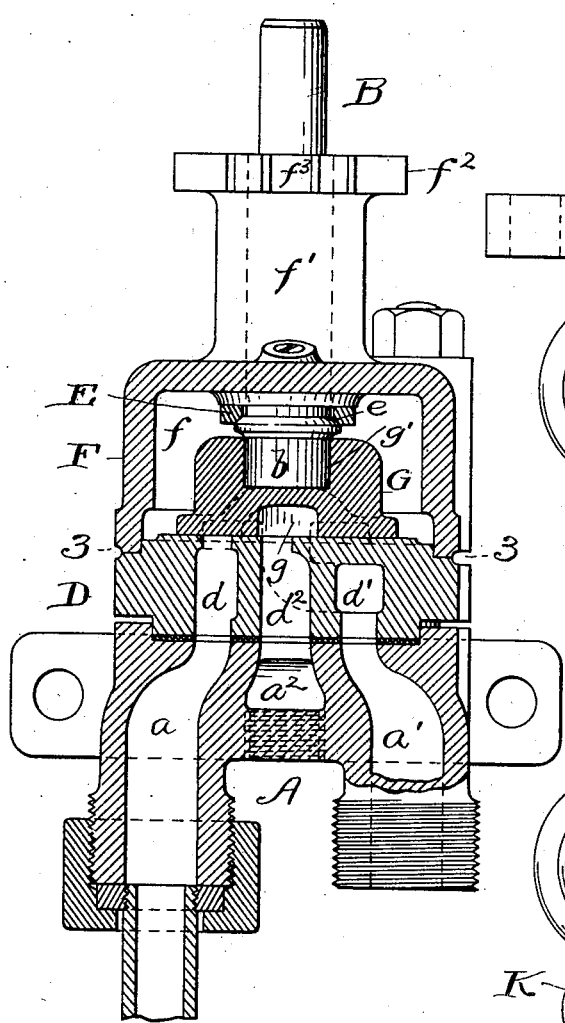
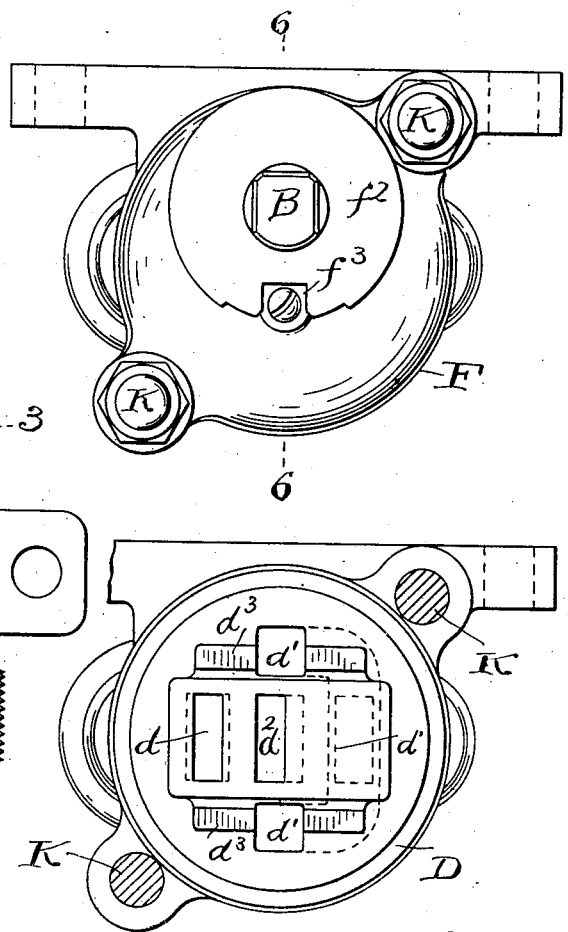
Witnesses:
A. L. Lord.
E. B. Gilchrist.
Inventor.
Edward Cheshire
By Thurston & Bates
his Attorneys.

No. 762,025. PATENTED JUNE 7, 1904.
E. CHESHIRE.
CONTROLLING VALVE FOR AIR BRAKE SYSTEMS.
APPLICATION FILED NOV. 11, 1903.
NO MODEL. 2 SHEETS—SHEET 2.
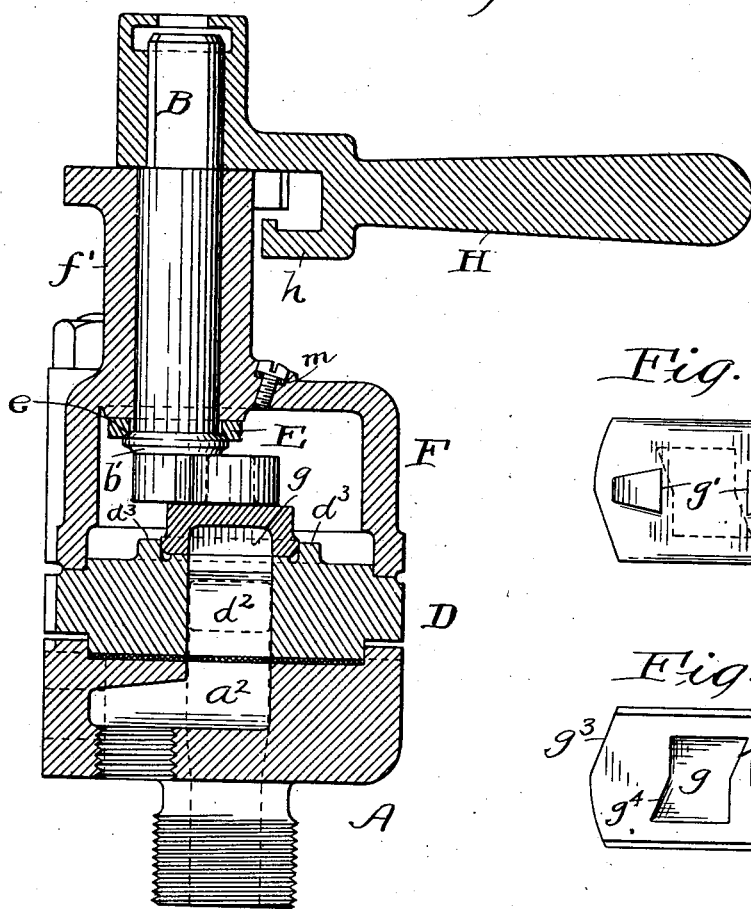
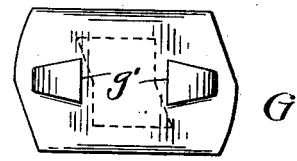
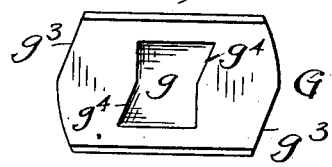
Witnesses:
A. L. Lord.
E. B. Gilchrist.
Inventor.
Edward Cheshire.
By Thurston & Bates
his Attorneys.

No. 762,025. Patented June 7, 1904.

UNITED STATES PATENT OFFICE.

EDWARD CHESHIRE, OF MILWAUKEE, WISCONSIN.

CONTROLLING-VALVE FOR AIR-BRAKE SYSTEMS.

SPECIFICATION forming part of Letters Patent No. 762,025, dated June 7, 1904.

Application filed November 11, 1903. Serial No. 180,670. (No model.)

*To all whom it may concern:*

Be it known that I, EDWARD CHESHIRE, a citizen of the United States, residing at Milwaukee, in the county of Milwaukee and State of Wisconsin, have invented a certain new and useful Improvement in Controlling-Valves for Air-Brake Systems, of which the following is a full, clear, and exact description, reference being had to the accompanying drawings.

The object of the invention is to provide a cheap, efficient, durable, and easily-operated valve mechanism useful in air-brake systems for controlling the flow of compressed air to and from the air-brake cylinder or train-pipe which leads thereto.

The invention may be here summarized as consisting of the construction and combination of parts hereinafter described, and pointed out definitely in the claims.

In the drawings, Figure 1 is a central sectional view of my invention. Fig. 2 is a plan view thereof. Fig. 3 is a sectional plan view in the plane of line 3 3 of Fig. 1. Fig. 4 is a plan view, and Fig. 5 a bottom plan view, of the slide-valve; and Fig. 6 is a sectional view in the plane of line 6 6 of Fig. 2.

The mechanism consists, essentially, of three main elements—to wit, a valve-casing, an inclosed valve, and the operating mechanism therefor which projects outside of the casing. The casing is composed of three parts—to wit, a base or manifold A, the cover F, and the intermediate valve-seat piece D—which three parts are held together by bolts K or other suitable means, there being between said parts such packing as is needed. The base or manifold has through it three ports $a$ $a'$ $a^2$, of which the two former are to be connected by suitable pipes with the compressed-air tank and the air-brake cylinder, respectively. Either port may be connected with the brake-cylinder and the other with the compressed-air tank, depending upon the position of the valve-seat piece relative to the base. The port $a^2$ is the exhaust-port, and, if desired, a suitable pipe may be connected over the same. The valve-seat piece D contains also three through-ports $d$ $d'$ $d^2$, which at their lower ends register with the ports $a$ $a'$ $a^2$, respectively. The upper ends of the ports $d$ $d^2$ are in the path of the slide-valve G and are adapted to be closed thereby. The upper end of the port $d'$ is at one side of this valve, so that it can never be covered thereby. In the particular construction shown this port has two upper openings, both of which lie outside of the path of the valve. It is immaterial, however, whether one or two of such openings be provided.

The cover F has a recess $f$ in its lower end, so that when the cover is secured upon the valve-seat there is between them a chamber in which the valve operates and into which compressed air will be discharged through ports $d'$ from the compressed-air tank so long as the device is in use. The top face of the valve-seat piece D is nicely finished, and upon it rests the slide-valve G, which is guided in its movements by lugs or shoulders $d^3$ on the valve-seat. This valve is what is known as a D-valve—that is to say, it has a recess $g$ in its lower face, by which when the valve is properly positioned communication may be established between the ports $d$ and $d^2$. In the top side of the valve is a slot $g'$, which is transverse to the path of the valve. Into this slot projects a crank-pin $b$ on the lower end of the valve-operating shaft B, which shaft extends up through the sleeve-like extension $f'$ of the cover, in which it is rotatably mounted. When the valve is in the position relative to the ports $d$ $d^2$ shown in Fig. 1, both of said ports are closed and the valve-chamber is filled with compressed air, because it is in open communication with the compressed-air tank. If now the operating-shaft B is turned in one direction, the valve moves so as to uncover the port $d$ to a greater or less extent, and thereby to establish communication between the compressed-air tank and the brake-cylinder through the valve-casing. When the valve is moved in the contrary direction, communication is established between the air-brake cylinder and the exhaust-port through the recess $g$ in the valve G. This valve G has certain peculiarities of construction which while not absolutely essential to the operation of the device greatly improve the same and are subordinate parts of the present invention. The cutting edges $g^3$ $g^4$ of the valve are formed at an angle to the edges of the ports with which they coöperate, whereby one may nicely graduate the size of the openings without too delicate a manipulation of the operator-shaft.

Leakage around the operator-shaft from chamber $f$ is prevented even when the operator-shaft has become somewhat worn by the following means, which are shown in the drawings. A ring E loosely embraces the shaft and has a smooth flat surface which engages with a corresponding surface on the inner face of the cover around the opening through which the shaft passes. This ring has in its lower face a spherical valve-seat $e$, which is engaged by the spherical upper face of a flange $b'$ upon the operator-shaft. This operator-shaft may be provided with a handle H, which is fitted to its angular upper end. This handle has upon its under side a bent finger $h$, which may pass down through a notch $f^3$ in an annular flange $f^2$ on the cover. When the handle and the operating-shaft are turned, this finger passes beneath this flange and prevents the removal of the handle. It is only possible to remove the handle, therefore, when the operator-shaft has been so turned as to bring the valve G into the position shown in Fig. 1, which shows the ports $d$ and $d^2$ as closed thereby, and the upper end of the shaft and the coöperating hole in the handle may be made of such irregular shape, substantially as shown, that the handle can only be replaced in one position relative to the shaft—viz., that position when the finger on the handle will pass through said slot.

It is thought desirable to provide some means for introducing a lubricant into the chamber $f$, and for this purpose a threaded hole, is drilled through the cover into said valve-chamber. This hole is tightly closed by means of a screw M, which screws into said hole, and a lead or other compressible washer $m$, which surrounds the screw just below its head. By screwing the screw up tightly this washer completely closes the hole.

There may be circumstances under which it may be more convenient to connect the compressed-air tank with the port $d$ and the train-pipe which passes to the air-brake cylinder to the port $d'$—in other words, to reverse the connection shown in Fig. 1. It is possible to adapt the device shown to use in this manner by simply placing the valve-seat piece D one hundred and eighty degrees from the position shown in Fig. 1. Because of this characteristic of the device the valve has two inclined cutting edges $g^3$ and two cutting edges $g^4$. One set of cutting edges are useful when the valve-seat is in one position, and the other set is useful when the valve-seat is in the reversed position. The reversal of the valve-seat also reverses the direction in which the operator-handle must be moved to operate the valve with the results stated.

Having described my invention, I claim—

1. The combination of a valve-casing containing a valve-chamber having an inlet-port, and composed of three separably-connected parts, of which the intermediate part is a reversible valve-seat piece having two ports through it, with a D-valve in said chamber sliding on said seat, and operating mechanism for said valve, substantially as described.

2. The combination of a valve-casing composed of three separably-connected parts, viz., a base-piece having three through-ports, a valve-seat piece having three through-ports which register in their lower ends with the ports in the base when the valve-seat piece occupies thereon either of two reversed positions relative thereto, and a cover containing a valve-recess, with a D-valve in said recess sliding upon said valve-seat piece and coöperating with two of said ports, and valve-operating mechanism, substantially as described.

3. The combination of a valve-casing having a suitable inlet-port, and having also two other ports through the one valve-seat surface, and a sliding and guided D-valve in said casing having inclined cutting edges for coöperating with said two ports, substantially as described.

4. The combination of a valve-casing having a suitable inlet-port and two other ports through one valve-seat, a D-valve sliding on said seat, and a valve-operator shaft extending out through the wall of the casing and having within the casing an external flange whose upper surface is spherical, and a ring loosely placed around said shaft having a flat upper surface which engages with the inner flat surface of the casing, and a lower spherical surface which engages with the corresponding surface on said flange, substantially as described.

In testimony whereof I hereunto affix my signature in the presence of two witnesses.

EDWARD CHESHIRE.

Witnesses:
JOHN S. KANEY,
L. A. SOULE.